Patented Oct. 31, 1922.

1,434,124

UNITED STATES PATENT OFFICE.

GEORGE W. KING, OF NEW YORK, N. Y.

METAL POLISH.

No Drawing. Application filed October 17, 1921. Serial No. 508,320.

*To all whom it may concern:*

Be it known that I, GEORGE W. KING, a citizen of the United States, residing at New York, in the county of New York and State of New York, have invented certain new and useful Improvements in Metal Polishes, of which the following is a specification.

The main object of this invention is the provision of a metal polish having the quality of non-inflammability, as well as producing a bright, mirror-like surface with a minimum of labor, such as rubbing.

The above and other objects will become apparent in the description below, in which I shall clearly set forth the composition of my polish.

My preferred composition and proportions of the various ingredients are as follows: one gallon of pure water, two pounds of powdered tripoli (light weight grade), one pound of infusorial earth (best grade), eight ounces of oxalic acid, (crystallized), one-half teaspoonful of liquid sassafras (to prevent stagnation of water), one-fourth teaspoonful of jeweler's rouge (for coloring and to assist in polishing).

The whole mixture above is then placed in a crock and allowed to settle for twelve hours or more, after which it is well stirred. Finally the mixture is strained and bottled.

The polish made according to the above specification, is non-inflammable, and requires no rubbing, and it will in no way injure the finest of metal.

I claim:

A metal polishing compound composed of one gallon of water, two pounds of powdered tripoli, one pound of infusorial earth, eight ounces of oxalic acid, one-half teaspoonful of liquid sassafras, one-fourth teaspoonful of jeweler's rouge.

In witness whereof I affix my signature.

GEORGE W. KING.